(12) United States Patent
Warino et al.

(10) Patent No.: US 6,382,956 B1
(45) Date of Patent: May 7, 2002

(54) MOLD FOR PRODUCING A RESIN MOLDED ARTICLE

(75) Inventors: Koichi Warino; Toshiyuki Ito; Masahiro Suzuki; Takao Hosokawa, all of Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/712,913

(22) Filed: Nov. 16, 2000

Related U.S. Application Data (62) Division of application No. 09/048,893, filed on Mar. 27, 1998, now Pat. No. 6,171,527.

(30) Foreign Application Priority Data

| Mar. 31, 1997 | (JP) | .............................................. 9-80920 |
| Aug. 1, 1997 | (JP) | ............................................ 9-207608 |
| Aug. 22, 1997 | (JP) | ............................................ 9-226137 |
| Aug. 28, 1997 | (JP) | ............................................ 9-232041 |

(51) Int. Cl.$^7$ .......................... B29D 11/00; B29C 45/00
(52) U.S. Cl. ....................... 425/547; 425/810
(58) Field of Search ................................. 425/547, 552, 425/810; 264/1.33, 1.34, 106, 328.14, 328.16

(56) References Cited

U.S. PATENT DOCUMENTS

| 5,412,016 A | 5/1995 | Sharp et al. |
| 5,458,818 A | 10/1995 | Kim et al. |
| 5,897,814 A | 4/1999 | Niemeyer et al. |

*Primary Examiner*—Nam Nguyen
*Assistant Examiner*—Donald Heckenberg
(74) *Attorney, Agent, or Firm*—Oblon, Spivak, McClelland, Maier & Neustadt, P.C.

(57) ABSTRACT

A mold for producing a resin molded article. The mold comprises a molding cavity with a member having a recessed surface which defines the shape of the article being molded. Between the molding cavity wall and the member is a thin plate body having a heat capacity such that when a resin having a temperature higher than its transfer starting temperature is introduced into the recessed surface of the member, the resin near the recessed surface is cooled to a temperature lower than its transfer starting temperature, and then the temperature of the resin is increased to a temperature exceeding its transfer starting temperature after the resin fills the recessed surface.

5 Claims, 7 Drawing Sheets

MOLD FOR PRODUCING A RESIN MOLDED ARTICLE

This application is a Division of application Ser. No. 09/048,893 Filed on Mar. 27, 1998 now U.S. Pat. No. 6,891,527.

BACKGROUND OF THE INVENTION

1. Field of the Invention

The present invention relates to a process for producing a resin molded article and a mold which is used in the process. In accordance with the present invention, a resin molded article having a fine uneven structure on the surface can be produced advantageously. For example, the present invention can produce (1) a light-conducting plate used in a back light of a liquid-crystal display or the like, (2) a lens sheet such as a Fresnel lens sheet or a lenticular lens sheet used in a screen of a liquid-crystal projection TV or a projector, a condensing Fresnel lens sheet or the like, and (3) a substrate of an optical recording medium that retrieves an information of an image or the like or that optically records or retrieves the same.

2. Description of the Related Art

In general, a molded article having a fine uneven structure on the surface is produced by injection-molding a thermoplastic resin. As the molded article, a substrate of an optical recording medium is mentioned. An optical recording medium such as an optical disk has been spread worldwide since a compact disk (CD) and a laser disc (LD) began to be marketed in the early 1980s. The development and the study of a high-density optical disk in which large-capacity data such as a moving information of approximately 2 hours is digitally recorded on a clear resin molded substrate of a CD size and which is thinner than conventional CD and LD have been currently conducted. This large-capacity optical disk is generally produced by, in view of the mass-production and the cost, a method in which a clear resin is injection-molded, and pits or grooves on a surface of a stamper mounted on a mold are transferred thereon to form a substrate.

In the injection-molding step of the substrate of the optical recording medium, the molten resin is injected into the cavity of the mold, and the pressure is exerted within the cavity through the molten resin of a sprue or a runner in the pressure holding step until a gate is completely cooled and solidified, thereby transferring the shape of the mold. After the gate is solidified, the resin in the mold is cooled and solidified to obtain a molded article (substrate of optical recording medium).

When the molten resin injected into the cavity by the above-mentioned injection-molding is brought into contact with the cavity surface, this molten resin is abruptly cooled, and filled into the cavity while a cooled and solidified layer is formed. The thus-cooled and solidified layer decreases the transferability, causes occurrence of a weld mark and a cold mark that induce abnormal light emission at a portion in contact with the molten resin filled, decreases the strength at the weld mark and the cold mark, decreases qualities owing to the deformation by residual stress, deteriorates appearance due to the deformation and causes occurrence of a flow mark.

Figure 9:
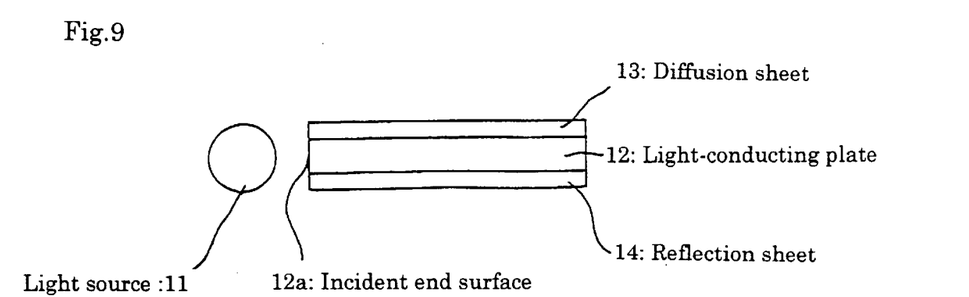
FIG. 9 is a view showing a structure of an illuminator obtained upon using a light-conducting plate.

A conventional method for producing a light-conducting plate is described below. A structure of an illuminator used in a back light of a liquid-crystal display is shown in FIG. 9. As shown in FIG. 9, the illuminator comprises a light source such as a cold cathode, a light-conducting plate 12 mounted such that an incident end surface 12a is situated in the vicinity of the light source 11, a diffusion sheet disposed on the surface of the light-conducting plate 12, and a reflection sheet 14 mounted opposite to the diffusion sheet 13 of the light-conducting plate 12. In the illuminator having such a structure, a light from the light source 11 is entered into the light-conducting plate 12 from the incidental end surface 11a. The light entered into the light-conducting plate 12 is transmitted in the direction opposite to the incidental end surface 12a while being reflected on the surfaces of the diffusion sheet 13 and the reflection sheet 14. During that time, a part of the light comes out of the surface of the light-conducting plate 12, passes through the diffusion sheet 13 and is released outside the illuminator as a diffused light to obtain an illumination light having a uniform brightness.

In the above-mentioned conventional illuminator, in order to obtain a uniform diffused light, a pattern having a dot-like distribution was printed on a reverse surface (surface on a reflection sheet 14 side) of a light-conducting plate, or the reverse surface was roughened or embossed, or a pattern having a prism-like distribution was given thereon.

When a light-conducting plate is produced by injection molding, a pattern having a dot-like distribution is formed on the light-conducting plate using a mold in which an uneven pattern opposite to a desired uneven pattern is formed in a predetermined region.

The cooled and solidified layer formed when the molten resin injected into the cavity by the injection molding is brought into contact with the cavity surface and abruptly cooled involves problems that the photoconductive sheet, like the substrate of the optical recording medium, decreases the transferability, causes abnormal light emission, decreases the strength, causes deformation, gives a poor appearance and causes occurrence of a flow mark.

A conventional method for producing a lens sheet is described below. When producing a lens sheet having a large area such as a Fresnel lens sheet or a lenticular lens sheet, generally a flat lens mold heated is brought into contact with a resin plate, and pressed to transfer an uneven lens surface of the lens mold on the resin plate. In this method, however, a molding cycle is long, and a productivity is not high. Therefore, a technique has been recently developed in which an ultraviolet curing resin is coated on a lens mold, and a resin plate is placed thereon, and irradiated with an ultraviolet light to form a lens.

Meanwhile, a Fresnel lens sheet or a lenticular lens sheet having a relatively small size is produced by injection-molding a synthetic resin. When a lens sheet is produced by injection molding, a lens surface is processed using a mold in which an uneven pattern opposite to an uneven pattern of a desired lens surface is formed.

The cooled and solidified layer generated when the molten resin injected into the cavity by the injection-molding is brought into contact with the cavity surface and abruptly cooled involves problems that the lens sheet, like the substrate of the optical recording medium, decreases the transferability, causes abnormal light emission, decreases the strength, causes deformation, gives a poor appearance and causes occurrence of a flow mark.

In order to suppress the generation of the cooled and solidified layer that decreases the transferability in the conventional injection molding, it is generally considered that the molding conditions are changed such that the temperature of the molten resin is increased and the injection rate is increased or the mold temperature is controlled using a cryogenic cycle temperature regulator. However, in this method, the resin is thermally deteriorated or yellowed due to the prolongation of the molding cycle and the light transmission is decreased, so that a substrate of an optical recording medium causes insufficient reading of a signal, or a molded article rendered at a high temperature in molding Is forcibly released from the mold to deform the molded article or decrease the productivity. Accordingly, this method is not satisfactory.

On the other hand, in order to reduce a non-uniformity of a stamper temperature, Japanese Patent Laid-Open No. 26,616/1991 discloses a technique in which a stamper is closely adhered to a mold using a magnet, and Japanese Patent Laid-Open No. 224,921/1992 discloses a technique in which a stamper is closely adhered to a mold using a viscous thin film. In these techniques, the overall transfer surface of the stamper in the mold can uniformly be cooled, making it possible to provide a uniform transferability of a substrate of an optical recording medium. However, the cooled and solidified layer of the resin filled cannot be decreased, making it impossible to improve the transferability. Further, Japanese Patent Laid-Open No. 180,541/1987 discloses a technique in which a material having a thermal conductivity of $7 \times 10^{-2}$ cal/cm·sec·° C. or less is coated on a reverse surface of a stamper used in the injection molding of a compact disk or the like, and Japanese Patent Laid-Open No. 178,774/1995 discloses that a heat-insulating mold insert is mounted on a reverse surface of a stamper to retard initial cooling of a thermoplastic material during molding. However, the techniques described in these documents provide an insufficient consideration on a relationship between properties of a resin used in the injection molding and a heat capacity of a mold including a stamper. Accordingly, when the techniques described in these documents are applied to the production of a recent optical disk having a higher density than CD or LD and having finer pits or grooves, for example, a heat supplied from the molten resin to the stamper is rapidly escaped into a mold, whereby occurrence of the cooled and solidified layer cannot be controlled and no sufficient transferability can be provided.

The process for producing the resin molded article in the present invention has been achieved to solve the above-mentioned problems. The present invention is to provide a process in which formation of a cold and solidified layer on a surface of a molten resin injected into a cavity is minimized to improve a transferability and to decrease occurrence of a weld mark, a cold resin mark and a flow mark, and a high productivity is realized. Further, the mold of the present invention is used to produce the resin molded article of the present invention.

SUMMARY OF THE INVENTION

A process for producing a resin molded article in the present invention to solve the above-mentioned problems is characterized by introducing a thermoplastic resin having a temperature higher than a transfer starting temperature into a cavity formed by a mold which is retained at a temperature lower than the transfer starting temperature, and injection-molding the thermoplastic resin using the mold in which a heat capacity of a surface on the cavity side is set such that the temperature of the thermoplastic resin near the surface of the mold which resin is cooled with the mold having a temperature lower than the transfer starting temperature to a temperature lower than the transfer starting temperature is increased again to a temperature exceeding the transfer starting temperature after the thermoplastic resin is filled in the cavity. The transfer starting temperature referred to in the present specification means a temperature which is obtained from an intersecting point between a tangent of a graph in a phase transfer region and a tangent of a graph of a rubbery flat region when measuring a relationship between a temperature and a longitudinal modulus coefficient (storage modulus) of a thermoplastic resin used in the molding.

The present invention produces a resin molded article having a fine uneven structure on the surface advantageously. For example, a light-conducting plate, a lens sheet, a substrate of an optical recording medium and an optical functional product having waveguide patterns can be produced by the process of the present invention.

In the process for producing the resin molded article in the present invention, a mold for producing a resin molded article is used which is characterized in that a thin plate member in which a thin plate body having the first surface constituting a cavity is mounted on the cavity side and a member having a thermal conductivity lower than the thin plate body is disposed on the second surface opposite to the first surface is mounted on the cavity site, the heat capacity of the thin plate member being set such that when a thermoplastic resin having a temperature higher than a transfer starting temperature is introduced into the cavity, the thermoplastic resin near the surface of the mold which resin is cooled with the mold having a temperature lower than the transfer starting temperature to a temperature lower than the transfer starting temperature is increased again to a temperature exceeding the transfer starting temperature after the thermoplastic resin is filled in the cavity.

In order to shorten the time required for one cycle of the injection-molding, the mold which has the thin plate member in which the thin plate body has a thermal conductivity of from 30 to 100 kcal/m·hr·° C. and a thickness of from 0.03 to 0.6 mm, and the member having the lower thermal conductivity has a thermal conductivity of from 0.2 to 0.5 kcal/m·hr·° C. and a thickness of from 0.05 to 0.3 mm, can be preferably used in the present invention. The mold for producing the light-conducting plate is preferably provided with the member having the lower thermal conductivity which member has the above-mentioned thermal conductivity and thickness, and with the thin plate member having the above-mentioned thermal conductivity and thickness. Further, the mold for producing the lens sheet or the substrate of the optical recording medium has the thin plate member in which the thin plate body has a thermal conductivity of from 30 to 100 kcal/m·hr·° C. and a thickness of from 0.3 to 0.6 mm, and the member having the lower thermal conductivity has a thermal conductivity of from 0.2 to 0.5 kcal/m·hr·° C. and a thickness of from 0.05 to 0.3 mm.

1 is a mold; 2 a thin plate member; 3, 6 thin plate bodies; 4, 7 members having a lower thermal conductivity; 5 a back plate; 8 an outer peripheral side holding ring; 9 an inner peripheral side holding ring; and 10 a mold structural member.

DESCRIPTION OF THE PREFERRED EMBODIMENTS

Figure 1:
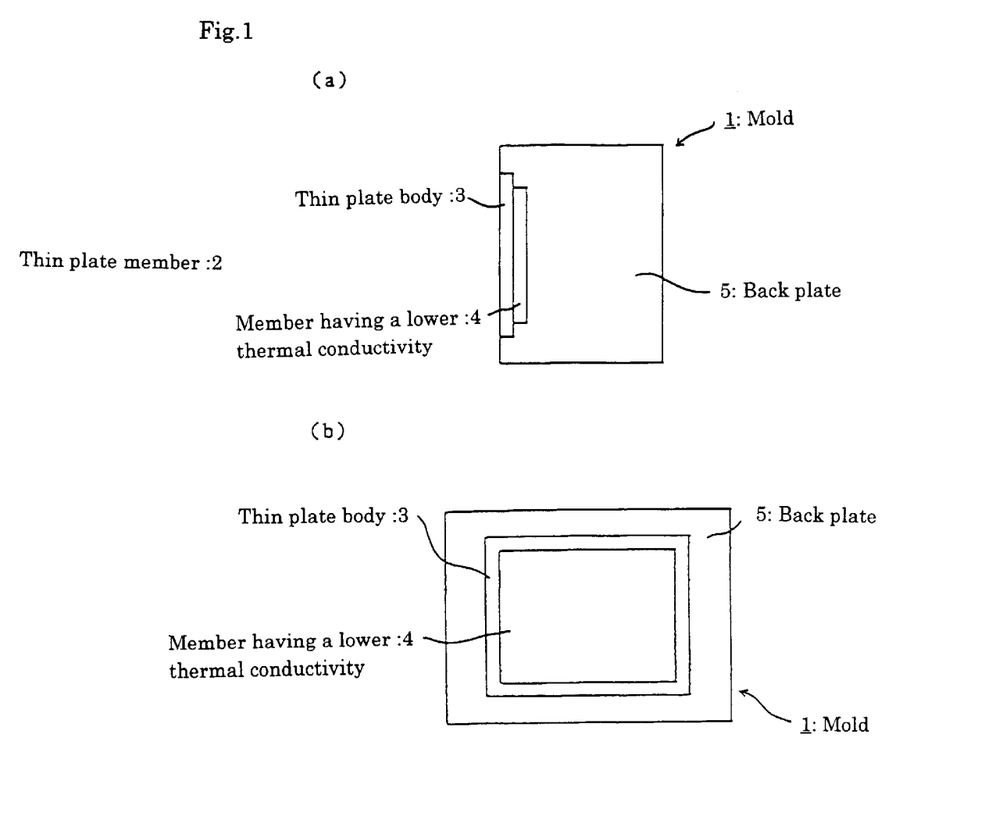
FIG. 1 is a view illustrating installation of a thin plate member into a mold in the present invention.

An example of a sectional structure of the mold for producing the resin molded article in accordance with the present invention is shown in FIG. 1(a), and an example of a flat structure thereof in FIG. 1(b) respectively. This mold is mounted on an injection molding machine, and used in the injection molding of a resin molded article such as a light-conducting plate, a lens sheet, a substrate of an optical recording medium or the like. A thin plate member 2 of which one main surface constitutes a part of a cavity is mounted on a mold 1 according to the present invention. The thin plate member 2 comprises a thin plate body 3 and a member 4 having a lower thermal conductivity. One main surface (first surface) of the thin plate body 3 constitutes a part of the cavity, and the member 4 having a lower thermal conductivity is disposed on another main surface (second surface) different from the main surface constituting the part of the cavity. A back plate 5 of the mold 1 is carved to a depth corresponding to the thickness of the thin plate member 2, and the thin plate member 2 is mounted thereon. The "main surfaces" here referred to are two opposite surfaces having larger areas out of six surfaces constituting the thin plate member.

The reason that the process for producing the resin molded article in the present invention improves the transferability and decreases the occurrence of a weld mark, a cold resin mark, a flow mark and the like is described hereinafter upon using an example in which a light-conducting plate is produced from a polymethyl methacrylate resin.

Figure 2:
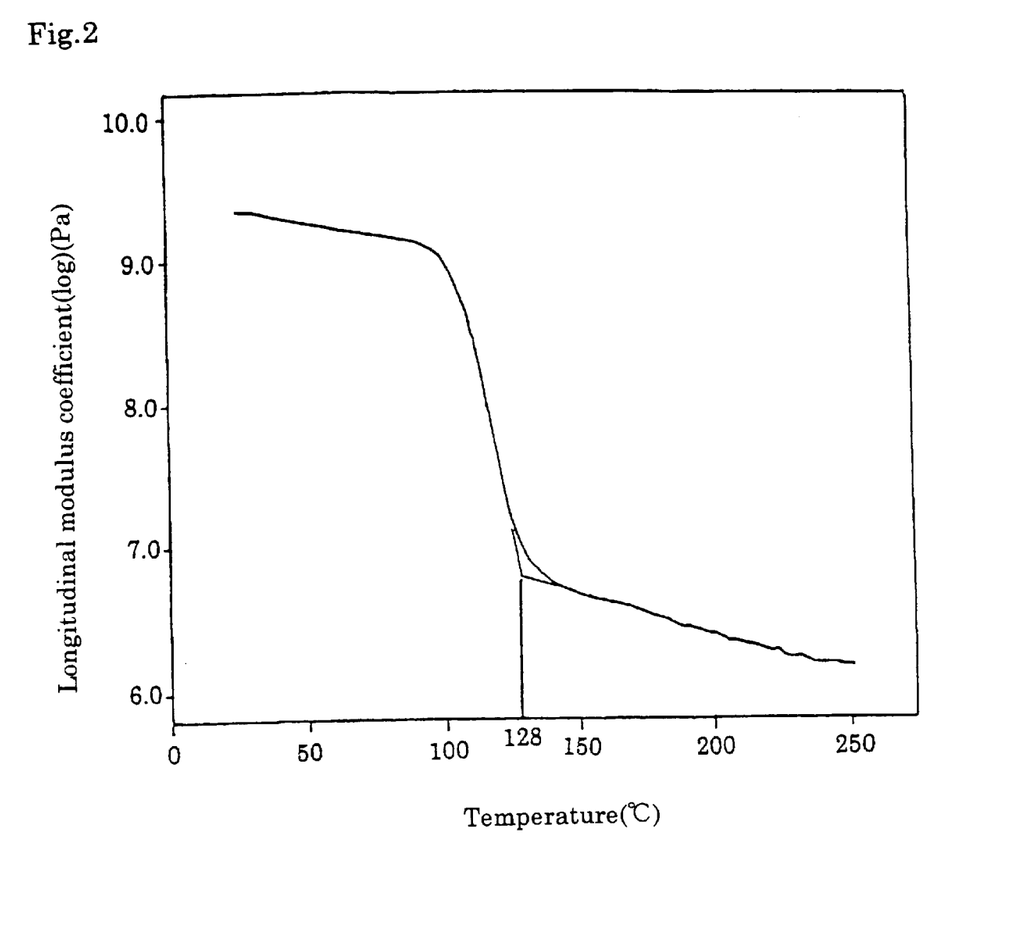
FIG. 2 is a graphical representation showing results of measuring a relationship between a temperature and a longitudinal modulus coefficient of a polymethyl methacrylate resin.

The results obtained by measuring a relationship between a temperature and a longitudinal modulus coefficient of a polymethyl methacrylate resin (Parapet HR-1000LC supplied by Kuraray Co., Ltd.) is shown in FIG. 2. As shown in FIG. 2, when a relationship between a temperature and a longitudinal modulus coefficient of a polymethyl methacrylate resin (bending mode) is measured and a temperature dependence of a storage modulus is obtained, there is a temperature at which the inclination of a graph changes greatly, and this temperature is a transfer starting temperature referred to in the present specification. As shown in FIG. 2, a transfer starting temperature of the polymethyl methacrylate resin (Parapet HR-1000LC supplied by Kuraray Co., Ltd.) which is obtained from an intersecting point between a tangent of a graph of a phase transition region and a tangent of a graph of a rubbery flat region is 128° C.

Figure 3:
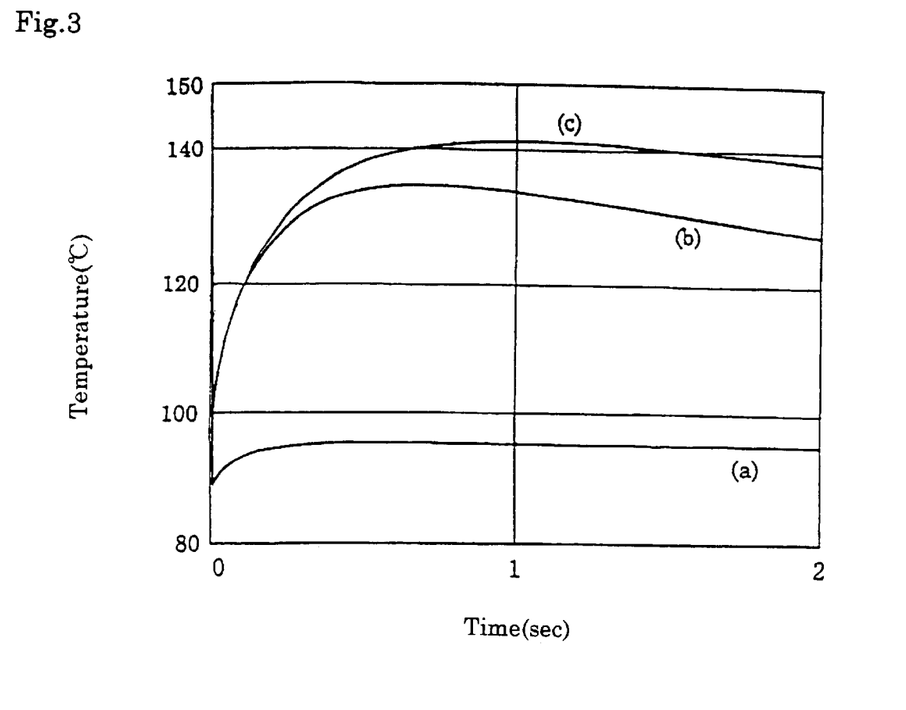
FIG. 3 is a graphical representation showing results given by obtaining a relationship between a time (sec) after injection and a temperature of a surface of a polymethyl methacrylate resin in contact with a mold through simulation by analysis of non-steady heat conduction using MARC.
Figure 4:
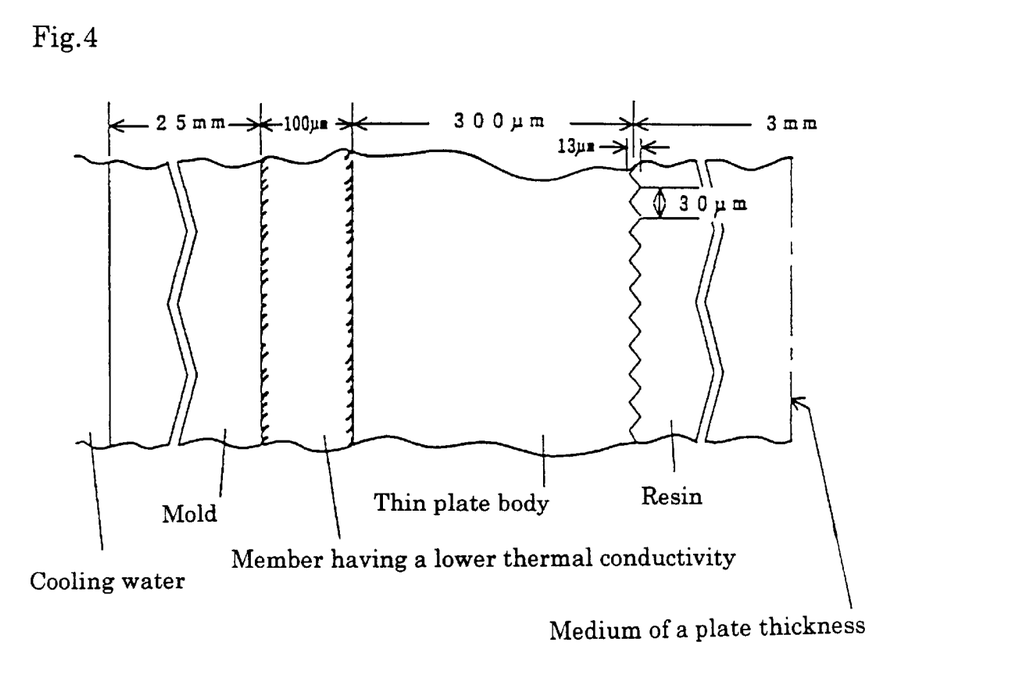
FIG. 4 is a view showing conditions for simulation on a light-conducting plate having the results in FIG. 3.

A relationship between a time (sec) after the injection and a temperature of a surface of a polymethyl methacrylate resin in contact with a mold was measured through simulation by analysis of non-steady thermal conduction using MARC (supplied by MARC) when a temperature of a mold was set at 85° C. and a temperature of the polymethyl methacrylate resin (having the results of measurement shown in FIG. 2) injected in the cavity was set at 280° C. The results are shown in FIG. 3. As shown in FIG. 4, the simulation was conducted under such conditions that the thickness of the molded article was 3 mm, the thickness of the mold (made of carbon steel) 25 mm and the thickness of the thin plate body (made of nickel) 0.3 mm respectively. The thermal conductivity of nickel of the thin plate body was 79.2 kcal/m·hr·° C. The uneven structure formed on the surface of the thin plate body had a height of 13 $\mu$m and a pitch of 30 $\mu$m. Further, a filling-up time is 1.4 sec, a molding cycle 60 sec, a thermal conduction coefficient of a cooling water side $1.0 \times 10^{-3}$ cal/mm$^2$·sec·° C. respectively.

FIG. 3(a) shows the results obtained by simulation when no thin plate member is mounted on a mold. When the polymethyl methacrylate resin having the temperature higher than the transfer starting temperature is introduced into the cavity, the polymethyl methacrylate resin near the surface of the mold is cooled with the mold having a temperature lower than the transfer starting temperature to a temperature lower than the transfer starting temperature, and the temperature no longer exceeds the transfer starting temperature. Thus, the temperature of the polymethyl methacrylate resin near the surface of the mold becomes lower than the transfer starting temperature to form a cooled and solidified layer on the resin within the cavity. After the resin is filled into the cavity, a pressure is exerted on the resin in the cavity in the pressure holding step, and an uneven pattern is transferred onto the polymethyl methacrylate resin to obtain a molded article (light-conducting plate). At this time, the cooled and solidified layer formed on the polymethyl methacrylate resin near the surface of the mold is forced into the uneven pattern with the pressure from the inside, causing non-uniform orientation, non-uniform cooling and occurrence of a weld mark, a cold resin mark, a flow mark and the like.

Meanwhile, FIGS. 3(b) and 3(c) show the results given by simulating a relationship between a time (sec) after injection and a temperature of the polymethyl methacrylate resin in contact with the mold in accordance with the process for producing the resin molded article in the present invention. FIG. 3(b) shows the results obtained by simulating a relationship between a time (sec) after injection and a temperature under the same conditions as in (a) using a mold fitted with a thin plate member in which a polyethylene terephthalate member having a lower thermal conductivity of 0.126 kcal/m·hr·° C. and a thickness of 0.1 mm is mounted on one surface of a nickel thin plate body having a thermal conductivity of 79.2 kcal/m·hr·° C. and a thickness of 0.3 mm. FIG. 3(c) shows the results obtained through the simulation under the same conditions as in (b) except that the thickness of the member having the lower thermal conductivity is changed to 0.15 mm.

As shown in FIGS. 3(b) and 3(c), the process for producing the resin molded article in the present invention uses a mold in which the heat capacity of a surface on the cavity side is set such that the temperature of the thermoplastic resin near the surface of the mold which resin is cooled with the mold from a temperature higher than a transfer starting temperature to a temperature lower than the transfer starting temperature is increased again to a temperature exceeding the transfer starting temperature after the thermoplastic resin is filled in the cavity. When a molded article such as a light-conducting plate or the like is produced using such a mold, the resin temperature immediately after injected becomes lower than the transfer starting temperature to form a cooled and solidified layer near the surface of the mold.

However, the resin temperature then exceeds the transfer starting temperature again so that the cooled and solidified layer that causes non-uniform orientation, non-uniform cooling or the like disappears. As a result, occurrence of a weld mark, a cold resin mark, a flow mark or the like is suppressed.

Incidentally, there is a technique in which only a surface of a cavity side in a mold is heated with a radiation heat using an infrared heater in order to prevent formation of the cooled and solidified layer. This technique is tentatively effective for preventing the formation of the cooled and solidified layer. However, the surface of the mold on the cavity side has to be heated for every cycle of the injection molding, and a time required for one cycle of the injection molding is prolonged.

Figure 5:
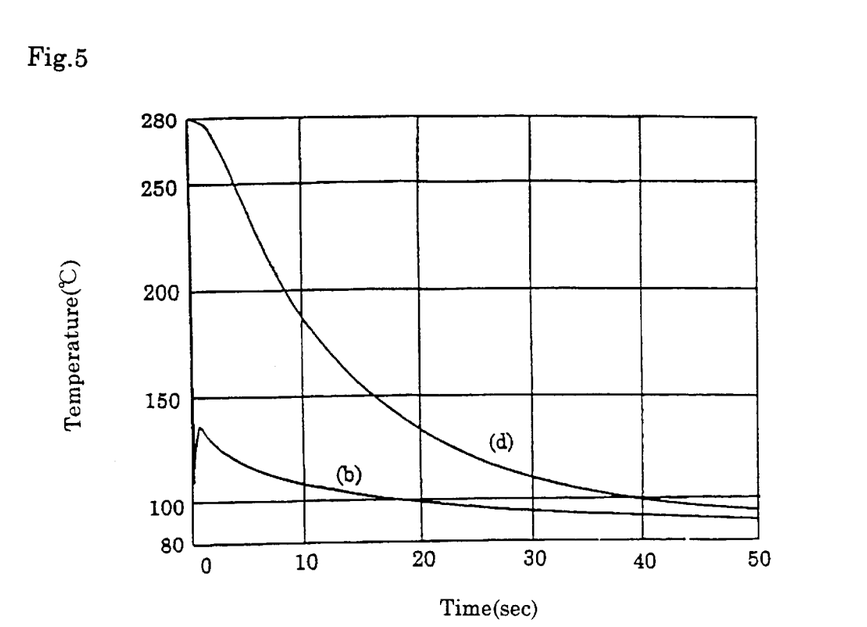
FIG. 5 is a graphical representation showing the simulation results of FIG. 3 for a prolonged period of time.

On the other hand, when the injection molding is conducted using the mold in which the thin plate member is fitted to the cavity as in the present invention, the temperature of the center of the resin in the cavity is not so different from the temperature when the injection molding is conducted using a mold having no thin plate member. FIG. 5 shows the results obtained by prolonging the time in the simulation of the relationship between the time (sec) after injection and the temperature of the surface of the polymethyl methacrylate resin in contact with the mold as shown in FIG. 3. The curve (d) shown in FIG. 5 indicates the temperature of the center of the resin in the cavity. The temperature of the center is approximately the same irrespective of the thin plate member and the thickness thereof.

When a light-conducting plate having an uneven pattern on the both main surfaces is produced according to the present invention, a pattern opposite to the uneven pattern to be formed on the surface of the light-conducting plate is provided on the main surface constituting the cavity of the thin plate member. Further, when a light-conducting plate to be produced is embossed, the main surface constituting the cavity of the thin plate member is embossed. Still further, when a dot-like pattern is printed on a light-conducting plate to be molded, the main surface of the thin plate member which constitutes the cavity remains a mirror surface (flat surface).

When a light-conducting plate to be molded has uneven patters on opposite surfaces or embossed opposite surfaces, the thin plate member may be molded by being mounted on both sides of the cavity of the mold. When the uneven pattern or the embossed pattern is given only to one surface of the light-conducting plate, it is possible that the thin plate member is mounted on one surface (surface having the uneven pattern or the embossed pattern), and the other surface remains a mirror surface. It is also possible that the thin plate members are mounted on both surfaces (in this case, the surface of one of the thin plate members is a mirror surface).

Figure 6:
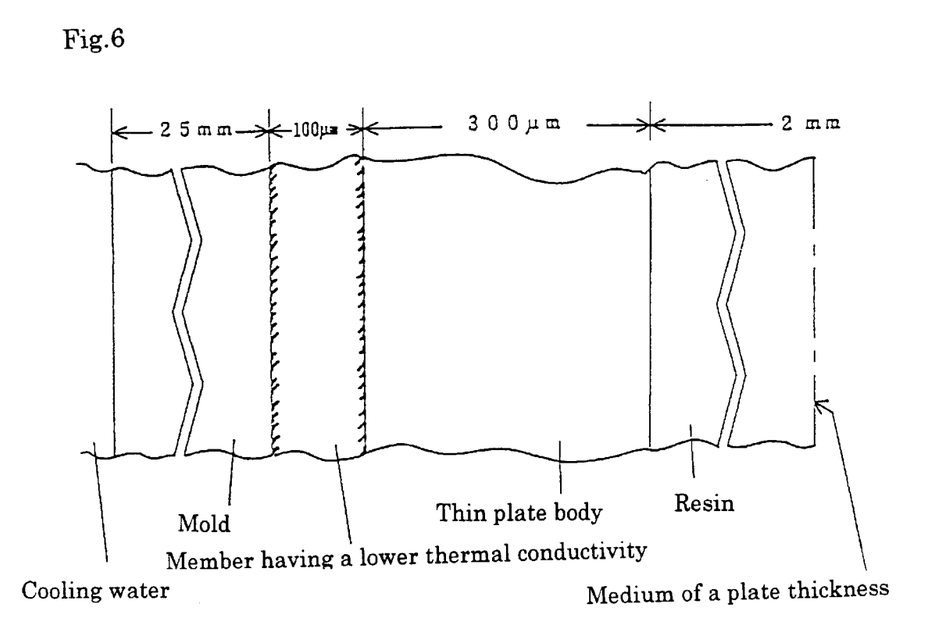
FIG. 6 is a view showing conditions for simulation on a lens sheet.

When a lens sheet is produced by the process for producing the resin molded article in the present invention, the transferability is also improved, and the occurrence of a weld mark, a cold resin mark, a flow mark and the like is also decreased. This was identified, as shown in FIG. 6, from the results obtained by conducting the simulation in by the above-mentioned process for producing the light-conducting plate under such conditions that the thickness of the molded article was 2 mm, the thickness of the mold (made of carbon steel) 25 mm, the thickness of the thin plate body (made of nickel) 0.3 mm and the thickness of the polyethylene terephthalate member having a lower thermal conductivity 0.1 mm respectively. In this case, the mold temperature was set at 85° C., the polymethyl methacrylate resin injected into the cavity was one having the results shown in FIG. 2, and the temperature thereof was set at 280° C. The filling-up time was 1.4 sec, the molding cycle 60 sec, and the thermal conduction coefficient on the cooling water side $1.0 \times 10^{-3}$ cal/mm$^2$·sec·° C. respectively.

When the lens sheet is produced according to the present invention, an uneven pattern opposite to that of a lens to be formed into a lens sheet is provided on the main surface constituting the cavity of the above-mentioned thin plate member. When the lens sheet to be produced has front and back uneven surfaces, the molds of the structure shown in FIG. 1 may be mounted on both surfaces of the cavity. When only one surface of the lens sheet is an uneven lens surface, the mold of the structure shown in FIG. 1 may be provided only on one surface of the cavity, and the other surface may remain a mirror surface.

Figure 7:
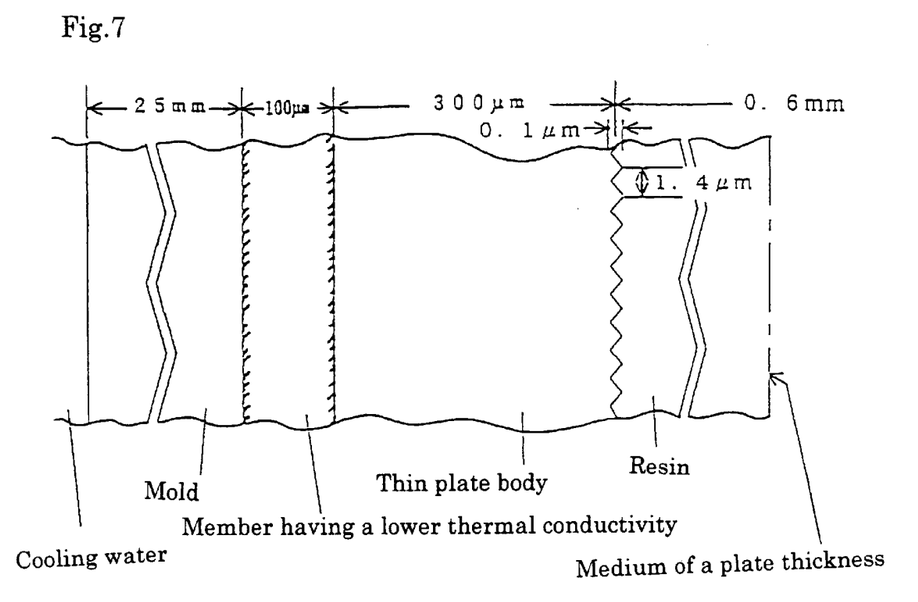
FIG. 7 is a view showing conditions for simulation on a substrate of an optical recording medium.

Even when the substrate of the optical recording medium is produced by the process for producing the molded article in the present invention, the transferability is improved, and occurrence of a weld mark, a cold resin mark, a flow mark and the like is reduced. This was identified, as shown in FIG. 7, from the results obtained by the same simulation as in the above-mentioned process for producing the light-conducting plate under such conditions that the thickness of the molded article was 0.6 mm, the thickness of the mold (made of carbon steel) 25 mm, the thickness of the thin plate body (made of nickel) 0.3 mm and the thickness of the polyethylene terephthalate member having a lower thermal conductivity 0.1 mm respectively. In this case, the uneven structure formed on the surface of the thin plate body had a height of 0.1 $\mu$m and a pitch of 1.4 $\mu$m. Further, the temperature of the mold was set at 85° C., an acrylic resin (Parapet HR-1000LC, supplied by Kuraray Co., Ltd., transfer starting temperature: 128° C.) comprising 90% by weight of methyl methacrylate and 10% by weight of methyl acrylate was used as a resin to be injected into the cavity, and the temperature of this resin was set at 280° C. The filling-up time was 1.4 sec, a molding cycle 60 sec, and a thermal conduction coefficient on a cold water side $1.0 \times 10^{-3}$ cal/mm$^2$·sec·° C. respectively.

Figure 8:
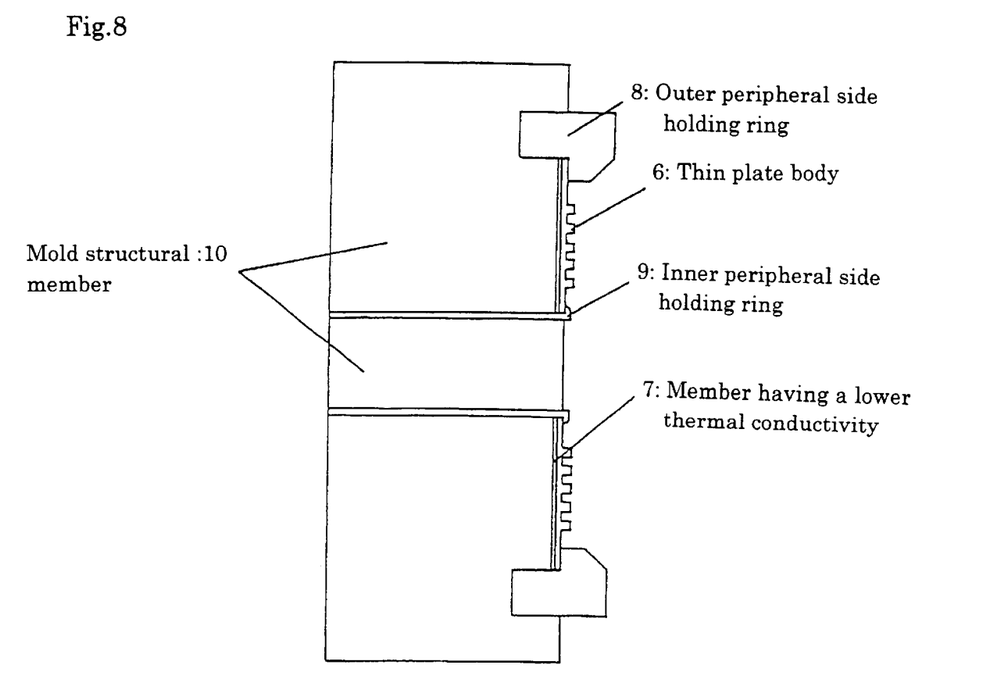
FIG. 8 is a view showing an example of a structure of a mold for producing an optical recording medium according to the present invention.

An example of a sectional structure of the mold for producing the substrate of the optical recording medium in accordance with the present invention is shown in FIG. 8. In FIG. 8, 6 is a thin plate body having grooves or pits formed therein, and 7 is a member having a lower thermal conductivity. The thin plate member comprises the thin plate body 6 and the member 7 having the lower thermal conductivity, and one main surface of the thin plate member becomes a part of the cavity. 8 is an outer peripheral side holding ring, and 9 is an inner peripheral side holding ring. These are secured to a mold structural member 10. The main surface constituting the cavity of the above-mentioned thin plate member is provided with an uneven pattern opposite to that of pits or grooves to be formed in the substrate of the optical recording medium. The mold in which no pits or grooves are formed may have a mirror surface. However, it is advisable, for more improving the transferability, that the molds having the structure shown in FIG. 8 are provided on both surfaces of the cavity.

The thin plate member is mounted on the mold by vacuum adsorption, adhesion using an adhesive or fixing with a magnet. When a mold for producing an optical recording medium is used, it is also possible to utilize a fixing method using an outer peripheral side holding ring and an inner peripheral side holding ring or a fixing method using a combination of vacuum deposition on an outer peripheral side and an inner peripheral side holding ring.

A thermoplastic resin to be used in the process of the present invention is not particularly limited. Examples thereof include polymethyl methacrylate, polycarbonate, polystyrene, polypropylene, polyethylene terephthalate, polyvinyl chloride, a thermoplastic elastomer and a copolymer thereof.

In accordance with the present invention, a resin molded article can be produced with a high transferability. Accordingly, when a light-conducting plate, a lens sheet, a substrate of an optical recording medium or the like is produced according to the present invention, desired properties can be provided which could not be given by the conventional method due to insufficient transfer. Further, since a deficiency of an appearance such as a weld line or the like does not occur in the resin molded article, a high-quality resin molded article free from abnormal light emission can be obtained. Since no warpage occurs even under an environment of a high temperature or a high humidity, a highly reliable resin molded article can be produced. Still further, since transfer can be conducted at a low inner pressure, a resin molded article can be produced using a molding machine of a smaller size than a conventional one, making it possible to reduce the cost. Furthermore, the present invention can produce a highly reliable substrate which is less deformed by a residual stress, whereby a substrate of an optical disk that can record a large-capacity data such as a moving information or the like can be produced.

The present invention is illustrated specifically by referring to the following Examples.

EXAMPLES 1 and 2

A nickel thin plate having a thermal conductivity of 79.2 kcal/m·hr· °C., a thickness of 0.3 mm and a size of 250 mm×220 mm was used as a thin plate body. An equilateral prismatic uneven pattern having a pitch of 50 µm and a height of 25 µm was arranged on the cavity side of the thin plate body. A polyimide film (member having a lower thermal conductivity) having a thermal conductivity of 0.3 kcal/m·hr·° C., a thickness of 0.1 mm and a size of 220 mm×170 mm was adhered to a parting surface (opposite to the cavity) of the thin plate body. The mold on which to fix this thin plate member was carved, from the parting surface of the mold, to a thickness of 0.3 mm and a size of 250 mm×220 mm to correspond to the nickel thin plate which was the thin plate body. It was further carved to a thickness of 0.1 mm and a size of 220 mm×170 mm to correspond to the polyimide film which was the member having the lower thermal conductivity. A polymethyl methacrylate resin could be molded into a light-conducting plate through injection molding under conditions shown in Table 1 using the mold fitted with this thin plate member.

An inner pressure at which to transfer a prismical shape was measured at a cylinder temperature of 270° C. using the above-mentioned mold, and it was found to be 38 MPa.

Comparative Example 1

A nickel thin plate (not provided with a member having a lower thermal conductivity) having a thermal conductivity of 79.2 kcal/m·hr·° C., a thickness of 0.3 mm and a size of 250 mm×220 mm was used as a member constituting a cavity. An equilateral prismatic uneven pattern having a pitch of 50 µm and a height of 25 µm was arranged on the cavity side of the thin plate body. A mold on which to fix this member was carved, from the parting surface of the mold, to a size of 250 mm×220 mm and a depth corresponding to the thickness of the nickel plate. The same polymethyl methacrylate resin as that used in Examples 1 and 2 was molded into a light-conducting plate by injection molding under the conditions shown in Table 1 using this mold.

Comparative Example 2

The same polymethyl methacrylate resin as that used in Examples 1 and 2 was molded into a light-conducting plate by injection molding under the conditions shown in Table 1, namely at a higher cylinder temperature and a higher mold temperature than those in Examples 1 and 2, using the same mold as that in Comparative Example 1.

Comparative Example 3

The same polymethyl methacrylate resin as that used in Examples 1 and 2 was molded into a light-conducting plate by injection molding under the conditions shown in Table 1 using the same mold as that in Comparative Example 1 such that a medium temperature of a mold temperature regulator was 100° C. until the pressure holding and 85° C. during the cooling.

TABLE 1

| | Thickness of a thin plate body (mm) | Thickness of a member having a lower thermal conductivity (mm) | Cylinder temperature (° C.) | Mold temperature (° C.) | Molding cycle (sec) | Height of a prism (µm) |
|---|---|---|---|---|---|---|
| Example 1 | 0.3 | 0.1 | 260 | 76 | 70 | 25 |
| Example 2 | 0.3 | 0.1 | 270 | 76 | 70 | 25 |
| Comparative Example 1 | 0.3 | — | 270 | 76 | 70 | 18 |
| Comparative Example 2 | 0.3 | — | 290 | 95 | 240 | 23 |
| Comparative Example 3 | 0.3 | — | 270 | 100° C. until the pressure holding 85° C. during cooling Time for increasing a temperature 60 sec | 260 | 25 |

Conditions: filling-up time 2 sec, holding pressure 70 to 80 Mpa
Material: Parapet GH-1000S, supplied by Kuraray Co., Ltd.

Table 1 reveals the following. In Comparative Example 1, the height of the prism was small, and the transferability was low. In Comparative Examples 2 and 3, the transferability was improved, but the molding cycle was prolonged. An inner pressure at which to transfer a prismical shape was measured at a cylinder temperature of 270° C. using the mold in Comparative Example 1, and it was found to be 55 MPa.

EXAMPLES 3 to 9

A nickel thin plate having a thermal conductivity of 79.2 kcal/m·hr·° C., a thickness of 0.3 mm and a size of 250 mm×220 mm was used as a thin plate body. An equilateral prismatic uneven pattern having a pitch of 50 μm and a height of 25 μm was arranged on the cavity side of the thin plate body. A polyimide film (member having a lower thermal conductivity) having a thermal conductivity of 0.3 kcal/m·hr·° C. and a size of 220 mm×170 mm was adhered to a parting surface (opposite to the cavity) of the thin plate body. At this time, the thickness of the polyimide film was changed as shown in Table 2. The same polymethyl methacrylate resin as that used in Examples 1 and 2 was molded into a light-conducting plate through injection molding under conditions shown in Table 2 using the above-mentioned mold. The height of the prism of the resulting light-conducting plate was measured, the appearance thereof was observed, and the warpage thereof was measured by an environmental test. The environmental test was conducted by allowing the light-conducting plate at 65° C. and 90% RH for 300 hours, and the warpage of the light-conducting plate after 300 hours was measured using a thickness gauge.

conductivity) having a thermal conductivity of 0.3 kcal/m·hr·° C., a thickness of 0.1 mm and a size of 220 mm×170 mm was adhered to a parting surface of the thin plate body. A polymethyl methacrylate resin could be molded into a lens sheet through injection molding under conditions shown in Table 3 using the mold fitted with this thin plate member.

An inner pressure at which to transfer a Fresnel lens pattern was measured at a cylinder temperature of 270° C. using the above-mentioned mold, and it was found to be 45 MPa.

Comparative Example 4

A thin nickel plate (not provided with a member having a lower thermal conductivity) having a thermal conductivity of 79.2 kcal/m·hr·° C., a thickness of 0.3 mm and a size of 250 mm×220 mm was used as a member constituting a cavity. A Fresnel lens pattern in which an effective area was 220 mm×166 mm, a pitch was 500 μm and a height was gradually changed from the center to the outer periphery within the range of from 25 to 80 μm was arranged on the cavity side of the thin plate body. A mold on which to fix this member was carved, from the parting surface -of the mold, to a size of 250 mm×220 mm and a depth corresponding to the thickness of the nickel plate. The same polymethyl methacrylate resin as that used in Examples 1 and 2 was molded into a lens sheet by injection molding under the conditions shown in Table 3 using this mold.

TABLE 2

| | Thickness of a thin plate body (mm) | Thickness of a member having a lower thermal conductivity (mm) | Height of a prism (μm) | Weld line of a molded article | Warpage (mm) before environmental test/after environmental test | Deformation in mold releasing |
|---|---|---|---|---|---|---|
| Example 3 | 0.3 | 0.1 | 25 | No | 0.1/0.2 | No |
| Example 4 | 0.1 | 0.1 | 25 | No | 0.15/0.15 | No |
| Example 5 | 0.6 | 0.1 | 25 | No | 0.15/0.2 | No |
| Example 6 | 0.3 | 0.05 | 25 | No | 0.15/0.25 | No |
| Example 7 | 0.3 | 0.3 | 25 | No | 0.1/0.15 | No |
| Example 8 | 0.1 | 0.05 | 25 | No | 0.1/0.2 | No |
| Example 9 | 0.6 | 0.3 | 25 | No | 0.15/0.25 | No |

Conditions: Cylinder temperature 270° C., mold temperature 76° C., filling-up time 2 sec, holding pressure 80 MPa, molding cycle 70 sec
Material: Parapet GH-1000S, supplied by Kuraray Co., Ltd.

As shown in Examples 3 to 9, when the thickness of the thin plate body was from 0.1 to 0.6 mm and the thickness of the member having the lower thermal conductivity was from 0.05 to 0.3 mm, a highly reliable molded article having a high prism transferability and free from a deficiency of an appearance such as a weld line or the like was obtained. Further, almost no warpage occurred even under the environment of a high temperature and a high humidity.

An example of a process for producing a lens sheet is described hereinafter.

EXAMPLES 10 and 11

A nickel thin plate having a thermal conductivity of 79.2 kcal/m·hr·° C., a thickness of 0.3 mm and a size of 250 mm×220 mm was used as a thin plate body. A Fresnel lens pattern in which an effective area was 220 mm×166 mm, a pitch was 500 μm and a height was gradually changed from the center to the outer periphery within the range of from 25 to 80 μm was arranged on the cavity side of the thin plate body. A polyimide film (member having a lower thermal

Comparative Example 5

The same polymethyl methacrylate resin as that used in Examples 1 and 2 was molded into a lens sheet at a higher cylinder temperature and a higher mold temperature than those in Examples 10 and 11 under the conditions shown in Table 3 using the same mold as that in Comparative Example 4.

Comparative Example 6

The same polymethyl methacrylate resin as that used in Examples 1 and 2 was molded into a lens sheet by injection molding under the conditions shown in Table 3 using the same mold as that in Comparative Example 4 such that a medium temperature of a mold temperature regulator was 100° C. until the pressure holding and 85° C. during the cooling.

TABLE 3

| | Thickness of a thin plate body (mm) | Thickness of a member having a lower thermal conductivity (mm) | Cylinder temperature (° C.) | Mold temperature (° C.) | Molding cycle (sec) | Hight of Fresnel lens pattern (μm) Center | Hight of Fresnel lens pattern (μm) Outside |
|---|---|---|---|---|---|---|---|
| Example 10 | 0.3 | 0.15 | 260 | 76 | 50 | 20 | 80 |
| Example 11 | 0.3 | 0.15 | 270 | 76 | 50 | 20 | 80 |
| Comparative Example 4 | 0.3 | — | 270 | 76 | 50 | 17 | 65 |
| Comparative Example 5 | 0.3 | — | 290 | 96 | 220 | 18 | 73 |
| Comparative Example 6 | 0.3 | — | 270 | 100° C. until the pressure holding 85° C. during cooling Time for increasing a temperature 60 sec | 240 | 20 | 80 |

Conditions: Charge time 2 sec, holding pressure 70 to 80 MPa
Material: Parapet GH-1000S, supplied by Kuraray Co., Ltd.

Table 3 reveals the following. In Comparative Example 4, the height of the Fresnel lens pattern was small, and the transferability was low. In Comparative Examples 5 and 6, the transferability was improved, but the molding cycle was prolonged. An inner pressure at which to transfer a Fresnel lens pattern was measured at a cylinder temperature of 270° C. using the mold in Comparative Example 4, and it was found to be 70 MPa.

EXAMPLES 12 to 18

A nickel thin plate having a thermal conductivity of 79.2 kcal/m·hr·° C., a thickness of 0.3 mm and a size of 250 mm×220 mm was used as a thin plate body. A Fresnel lens pattern having an effective area of 220 mm×166 mm, a pitch of 500 μm and a height which was gradually changed from the center to the outer peripheral portion within the range of from 25 to 80 μm was arranged on the cavity side of the thin plate body. A polyimide film (member having a lower thermal conductivity) having a thermal conductivity of 0.3 kcal/m·hr·° C. and a size of 220 mm×170 mm was adhered to a parting surface of the thin plate body. At this time, the thickness of the polyimide film was changed as shown in Table 4. The same polymethyl methacrylate resin as that used in Examples 10 and 11 was molded into a lens sheet through injection molding under the conditions shown in Table 4 using the above-mentioned mold. The height of the Fresnel lens pattern of the resulting lens sheet was measured, the appearance thereof was observed, and the warpage thereof was measured by the environmental test. This environmental test conducted by allowing the lens sheet to stand at 65° C. and 90% RH for 300 hours, and the warpage of the lens sheet after 300 hours was measured using a thickness gauge.

TABLE 4

| | Thickness of a thin plate body (mm) | Thickness of a member having a lower thermal conductivity (mm) | Hight of Fresnal lens pattern (μm) Center | Hight of Fresnal lens pattern (μm) Outside | Warpage (mm) before environmental test/after environmental t0st | Deformation in mold releasing |
|---|---|---|---|---|---|---|
| Example 12 | 0.3 | 0.15 | 20 | 80 | 0.1/0.15 | No |
| Example 13 | 0.1 | 0.15 | 20 | 80 | 0.15/0.1 | No |
| Example 14 | 0.6 | 0.15 | 20 | 80 | 0.15/0.2 | No |
| Example 15 | 0.3 | 0.1 | 20 | 80 | 0.2/0.2 | No |
| Example 16 | 0.3 | 0.3 | 20 | 80 | 0.1/0.15 | No |
| Example 17 | 0.1 | 0.1 | 20 | 80 | 0.1/0.2 | No |
| Example 18 | 0.6 | 0.3 | 20 | 80 | 0.15/0.2 | No |

Conditions: Cylinder temperature 270° C., mold temperature 76° C., filling-up time 2 sec, holding pressure 80 MPa, molding cycle 50 sec
Material: Parapet GH-1000S, supplied by Kuraray Co., Ltd.

As shown in Examples 12 to 18, when the thickness of the thin plate body was from 0.1 to 0.6 mm and the thickness of the member having the lower thermal conductivity was from 0.1 to 0.3 mm, a highly reliable molded article having a high Fresnel lens pattern transferability and free from a deficiency of an appearance such as a weld line or the like was obtained. Further, almost no warpage occurred under the environment of a high temperature and a high humidity.

An example of a process for producing a substrate of an optical recording medium is described hereinafter. An optical disk substrate having an outer diameter of 120 mm and a thickness of 0.6 mm was produced using an injection molding machine (SIM-4749, supplied by K. K. Technoplus). The transferability was evaluated by forming a platinum film on the surface of the optical disk substrate having grooves through sputtering, and measuring the shape of the groove using a scanning tunnel microscope (SAM 3100, supplied by Seiko Denshi Kogyo K. K.). The depth of the groove was found from the results of measuring the shape of the groove, and a value obtained upon dividing the depth of the groove of measurement by the depth of the groove of the thin plate body was defined as a transferability.

EXAMPLES 19 to 21

A nickel doughnut-type thin plate having a thermal conductivity of 79.2 kcal/m·hr·° C., a thickness of 0.3 mm, an outer diameter of 128 mm and an inner diameter of 37 mm was used as a thin plate body. Spiral grooves having a pitch of 0.7 μm and a depth of 12 μm were formed on the cavity side of the thin plate body within an area of the thin plate body having a radius of from 25 mm to 55 mm. A polyimide doughnut-type film (member having a lower thermal conductivity) having a thermal conductivity of 0.3 kcal/m·hr·° C., a thickness of 0.1 mm, an outer diameter of 128 and an inner diameter of 38 mm was adhered to a parting surface (opposite to the cavity) of the thin plate body. This thin plate member was fixed on the mold as shown in FIG. 8. In FIG. 8, 6 is a thin plate body having grooves formed therein, 7 a member having a lower thermal conductivity, 8 an outer peripheral side holding ring, and 9 an inner peripheral side holding ring respectively. These were fixed on a mold structural member 10. A substrate of an optical recording medium was produced by injection molding under the conditions shown in Table 5 using an acrylic resin (Parapet HR-1000LC, supplied by Kuraray Co., Ltd.) comprising 90% by weight of methyl methacrylate and 10% by weight of methyl acrylate. The transferability of this substrate was measured, and the results are shown in Table 5. The substrate produced in each of the above-mentioned Examples was less deformed.

Comparative ExampleS 7 to 9

A nickel doughnut-type thin plate (not provided with a member having a lower thermal conductivity) having a thermal conductivity of 79.2 kcal/m·hr·° C., a thickness of 0.3 mm, an outer diameter of 128 mm and an inner diameter of 37 mm was used as a member constituting a cavity. Spiral grooves having a pitch of 0.7 μm and a depth of 12 μm were formed on the cavity side of the thin plate body within an area of the thin plate body having a radius of from 25 mm to 55 mm. This thin plate body was fixed on the mold, as in FIG. 8, using an outer peripheral side holding ring and an inner peripheral side holding ring. A substrate of an optical recording medium was produced by injection molding under the conditions shown in Table 5 using the above-mentioned acrylic resin. The transferability of this substrate was measured, and the results are shown in Table 5.

What is claimed is:

1. A mold for producing a molded resin article, which comprises:

a mold with a cavity therein; and a thin plate member positioned in the mold cavity, the thin plate member comprising a thin plate body and a member with the thin plate member having a first recessed surface which defines the shape of an object to be molded and a second surface which faces a surface of the cavity of the mold, and said member having a thermal conductivity which is lower than that of the thin plate body positioned between and in contact with the surface of the mold cavity and said second surface of the thin plate body, wherein the heat capacity of the thin plate member is set such that when a thermoplastic resin having a temperature higher than its transfer starting temperature is introduced into the recessed surface of the thin plate body in the cavity, the thermoplastic resin near the recessed surface of the plate body is cooled to a temperature lower than the transfer starting temperature by the mold, which has a temperature lower than the transfer starting temperature, and then the temperature of the resin is again increased to a temperature exceeding its transfer starting temperature after the thermoplastic resin fills the recessed surface.

2. The mold of claim 1, wherein the thin plate body has a thermal conductivity of from 30 to 100 kcal/m·hr·° C. and at thickness of from 0.03 to 0.6 mm, and the member having the lower thermal conductivity has a thermal conductivity of from 0.2 to 0.5 kcal/m·hr·° C. and a thickness of from 0.05 to 0.3 mm.

3. The mold of claim 1, wherein the mold is made of carbon steel, the thin plate body is formed of nickel and the member having the lower thermal conductivity is formed of polyethylene terephthalate.

4. The mold of claim 3, wherein the thin plate body of nickel has a thermal conductivity of 79.2 kcal/m·hr·° C. and the polyethylene-terephthalate member has a thermal conductivity of 0.126 kcal/m·hr·° C.

5. The mold of claim 2, wherein the member having the lower thermal conductivity is formed of polyimide.

* * * * *

TABLE 5

| | Thickness of a thin plate body (mm) | Thickness of a member having a lower thermal conductivity (mm) | Cylinder temperature (° C.) | Temperature of a mold (° C.) | Mold pressure (ton) | Transferability (%) |
|---|---|---|---|---|---|---|
| Example 19 | 0.3 | 0.1 | 275 | 75 | 17 | 100 |
| Example 20 | 0.3 | 0.1 | 275 | 80 | 17 | 100 |
| Example 21 | 0.3 | 0.1 | 275 | 85 | 17 | 100 |
| Comparative Example 7 | 0.3 | — | 275 | 75 | 17 | 50 |
| Comparative Example 8 | 0.3 | — | 275 | 80 | 17 | 55 |
| Comparative Example 9 | 0.3 | — | 275 | 85 | 17 | 65 |